US012576837B2

(12) United States Patent
Ra et al.

(10) Patent No.:     US 12,576,837 B2
(45) Date of Patent:       Mar. 17, 2026

(54) OBJECT PERCEPTION METHOD FOR VEHICLE AND OBJECT PERCEPTION APPARATUS

(71) Applicants: Hyundai Motor Company, Seoul (KR); Kia Corporation, Seoul (KR)

(72) Inventors: Ju Hyeok Ra, Guri-si (KR); Hyun Ju Kim, Yongin-si (KR)

(73) Assignees: Hyundai Motor Company, Seoul (KR); Kia Corporation, Seoul (KR)

( * ) Notice:    Subject to any disclaimer, the term of this patent is extended or adjusted under 35 U.S.C. 154(b) by 151 days.

(21) Appl. No.: 18/524,037

(22) Filed:     Nov. 30, 2023

(65)              Prior Publication Data
        US 2024/0326790 A1      Oct. 3, 2024

(30)        Foreign Application Priority Data

Mar. 27, 2023    (KR) ........................ 10-2023-0039702

(51) Int. Cl.
      *B60W 30/095*          (2012.01)

(52) U.S. Cl.
      CPC ..... *B60W 30/095* (2013.01); *B60W 2420/408* (2024.01); *B60W 2552/30* (2020.02); *B60W 2554/801* (2020.02); *B60W 2554/802* (2020.02)

(58) Field of Classification Search
      CPC ......... B60W 30/095; B60W 2420/408; B60W 2552/30; B60W 2554/801; B60W 2554/802; B60W 2554/4044; B60W 40/02; B60W 40/105; B60W 40/114; B60W 2050/0005; B60W 2050/009; B60W 2520/10; B60W 2520/12; B60W 2520/14

(Continued)

(56)              References Cited

U.S. PATENT DOCUMENTS

2014/0081542  A1 *   3/2014   Yao ........................ B60W 10/06
                                                                        701/124
2019/0092328  A1 *   3/2019   Ide .................. B60W 60/00276
                                          (Continued)

FOREIGN PATENT DOCUMENTS

EP          3705384  A1 *   9/2020   ........ B60W 30/0953
JP       2013-142975  A    7/2013
                            (Continued)

OTHER PUBLICATIONS

Von Reyher, et al., "A lidar-based approach for near range lane detection," IEEE Proceedings. Intelligent Vehicles Symposium, 2005., Las Vegas, NV, USA, 2005, pp. 147-152, doi: 10.1109/IVS. 2005.1505093. (https://ieeexplore.ieee.org/document/1505093? source=IQplus) (Year: 2005).*

(Continued)

*Primary Examiner* — Atul Trivedi
(74) *Attorney, Agent, or Firm* — Banner & Witcoff, Ltd.

(57)              ABSTRACT

The present disclosure relates to an object perception method and an object perception apparatus. An object perception method may include detecting candidate objects by using at least one sensor; determining objects from a vehicle among the candidate objects; determining preceding objects among the vehicle objects from the vehicle; and determining the first closest preceding object and the second closest preceding object among the preceding objects.

20 Claims, 6 Drawing Sheets

Radius of curvature of a host lane

(58) Field of Classification Search
USPC ......................................................... 701/301
See application file for complete search history.

(56) References Cited

U.S. PATENT DOCUMENTS

| 2019/0092330 | A1* | 3/2019 | Ide | G01S 13/66 |
|---|---|---|---|---|
| 2019/0092331 | A1* | 3/2019 | Ide | B60W 10/20 |
| 2019/0103023 | A1* | 4/2019 | McNew | G08G 1/0962 |
| 2020/0062255 | A1* | 2/2020 | Fernando | B60W 30/188 |
| 2020/0406969 | A1* | 12/2020 | Ersal | B60W 10/20 |
| 2021/0325197 | A1* | 10/2021 | Ohmura | G01C 21/3484 |
| 2021/0370921 | A1* | 12/2021 | Silva | B60W 60/0027 |
| 2022/0097714 | A1* | 3/2022 | Reshef | G06V 20/588 |
| 2022/0340138 | A1* | 10/2022 | Seegmiller | B60W 30/045 |
| 2022/0412772 | A1* | 12/2022 | Rabani | G06V 20/588 |
| 2023/0013737 | A1* | 1/2023 | Kim | B60W 30/12 |
| 2023/0031419 | A1* | 2/2023 | Shimizu | B60W 40/072 |
| 2023/0139551 | A1* | 5/2023 | Zhao | B60W 30/18163 |
| | | | | 701/26 |
| 2023/0140569 | A1* | 5/2023 | Foster | B60W 30/146 |
| | | | | 701/400 |
| 2023/0202473 | A1* | 6/2023 | Shalev-Shwartz | |
| | | | | B60W 30/146 |
| | | | | 701/93 |
| 2023/0322208 | A1* | 10/2023 | Rojas | B60W 50/085 |
| | | | | 701/41 |
| 2024/0144829 | A1* | 5/2024 | Kim | G08G 1/167 |
| 2024/0326790 | A1* | 10/2024 | Ra | B60W 30/095 |

FOREIGN PATENT DOCUMENTS

| JP | 2018-062265 | A | 4/2018 | | |
|---|---|---|---|---|---|
| JP | 2023011755 | A | 1/2023 | | |
| KR | 10-1728323 | B1 | 5/2017 | | |
| KR | 10-1826628 | B1 | 2/2018 | | |
| KR | 2018-0078978 | A | 7/2018 | | |
| KR | 102709966 | B1 * | 9/2024 | ............. | H04N 23/90 |
| WO | WO-2017002816 | A1 * | 1/2017 | ............... | G08G 1/16 |
| WO | WO-2021096935 | A2 * | 5/2021 | ............ | B60W 40/04 |
| WO | WO-2021138619 | A2 * | 7/2021 | ........... | G06V 40/103 |
| WO | WO-2022016044 | A1 * | 1/2022 | ............... | B60Q 1/08 |
| WO | WO-2022047372 | A1 * | 3/2022 | ......... | G01C 21/3841 |

OTHER PUBLICATIONS

Von Reyher, et al., "A lidar-based approach for near range lane detection," IEEE Proceedings. Intelligent Vehicles Symposium, 2005., Las Vegas, NV, USA, 2005, pp. 147-152, doi: 10.1109/IVS. 2005.1505093 (https://ieeexplore.ieee.org/document/1505093) (Year: 2005).*

* cited by examiner

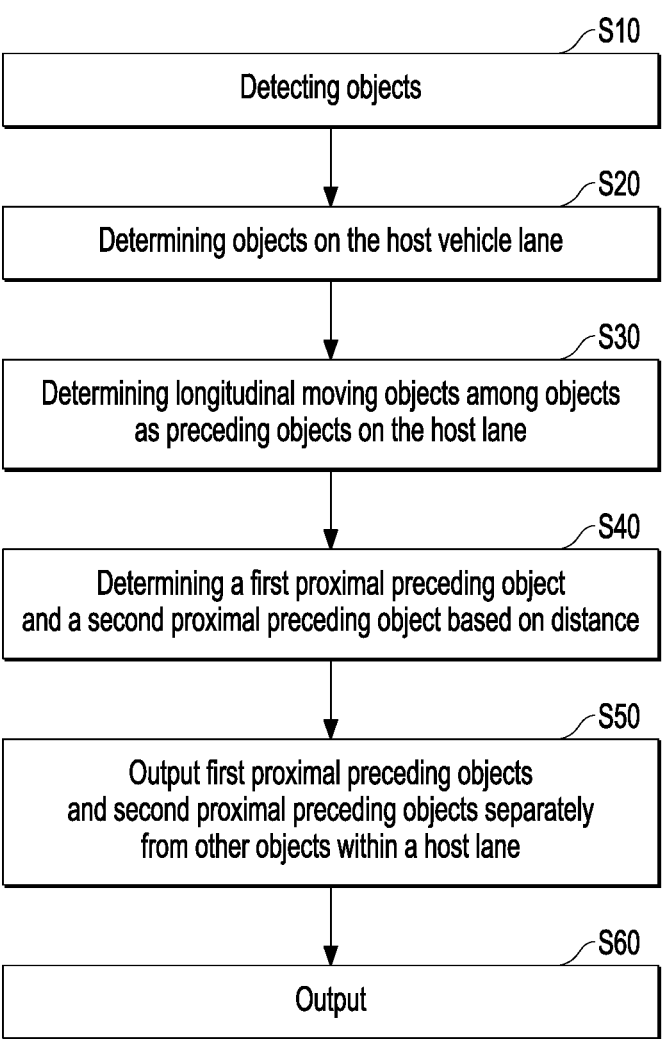

S10

Detecting objects

S20

Determining objects on the host vehicle lane

S30

Determining longitudinal moving objects among objects
as preceding objects on the host lane

S40

Determining a first proximal preceding object
and a second proximal preceding object based on distance

S50

Output first proximal preceding objects
and second proximal preceding objects separately
from other objects within a host lane

S60

Output

FIG. 2

● : Object Tracking Position

OBJECT PERCEPTION METHOD FOR VEHICLE AND OBJECT PERCEPTION APPARATUS

CROSS-REFERENCE TO RELATED APPLICATION

The present application claims priority to Korean Patent Application No. 10-2023-0039702, filed on Mar. 27, 2023, the entire contents of which is incorporated herein by reference in its entirety.

TECHNICAL FIELD

The present disclosure relates to an object perception method and an object perception apparatus.

BACKGROUND

Examples of sensors for recognizing the environment around the vehicle include a LiDAR sensor, a camera, a radar, etc.

For the driving safety of a vehicle, prompt and accurate perception of surrounding important objects may be required.

In particular, it is important to promptly and accurately perceive the nearest object among the preceding objects moving in the front of the host vehicle.

However, in determining the nearest object, since the size of the shape of the object depends greatly on the size of the shape of the object, the preceding objects in front of the nearest object may not be quickly determined as the nearest object in a situation where the nearest object is cut out, and thus countermeasures may be required.

BRIEF SUMMARY

Systems, apparatuses, methods, and computer-readable media are described for object perception for a host vehicle which may include detecting candidate objects using at least one sensor. The object perception for a host vehicle may further include determining ego-lane objects from among the candidate objects, determining preceding objects among the ego-lane objects, and determining a first closest preceding object and a second closest preceding object from among the preceding objects.

These and other features and advantages are described below in greater detail.

BRIEF DESCRIPTION OF DRAWINGS

FIG. 2 is a flowchart illustrating an object perception method according to one or more aspects of the present disclosure.

DETAILED DESCRIPTION

Figure 1:
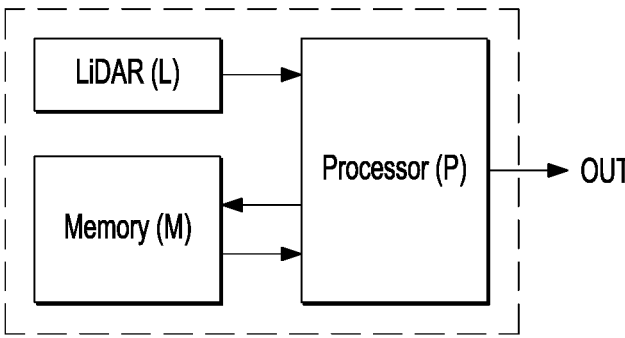
FIG. 1 shows an object perception apparatus according to one or more aspects of the present disclosure.

Since the present disclosure may be modified in various ways and has various examples and configurations, specific aspects and examples will be illustrated in the drawings. However, this is not intended to limit the present disclosure to specific examples, and it should be understood that the present disclosure includes all modifications, equivalents, and replacements included within the idea and technical scope of the present disclosure.

The suffixes "module" and "unit" used in the present specification are solely used for name differentiation between elements, and they should not be construed as assumptions that they are physically or chemically divided or separated or can be so divided or separated.

Terms including an ordinal number such as "first", "second", etc. are used to describe various elements, but the elements are not limited by these terms. The terms are used only for the purpose of distinguishing one element from another element.

The term "and/or" are used to include any combination of a plurality of items to be included. For example, "A and/or B" includes all three cases such as "A", "B", and "A and B".

If it is mentioned that an element is "connected" or "connected" to another element, the elements are either directly connected or connected to the other element, but it should be understood that another element exists in between.

The terminology used herein is for the purpose of describing particular examples only and is not intended to be limiting of the present disclosure. Singular expressions include plural expressions, unless the context clearly indicates otherwise. In the present application, it should be understood that the term "include" or "have" indicates that a feature, a number, a step, an operation, a component, a part, or a combination thereof described in the specification is present, but it does not exclude the possibility of presence or addition of one or more other features, numbers, steps, operations, components, parts, or combinations thereof in advance.

Unless otherwise defined, all terms used herein, including technical or scientific terms, have the same meaning as generally understood by those skilled in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the unit or the control unit may be a term widely used for naming a controller for controlling a vehicle specific function, and does not mean a generic function unit. For example, each unit or control unit include a communication device communicating with another controller or a sensor to control a function in charge, a computer-readable recording medium storing an operating system or a logic command, input/output information, and the like, and one or more processors performing determination, calculation, determination, and the like necessary for controlling a function in charge.

The processor may include a semiconductor integrated circuit and/or electronic devices that perform at least one or more of comparison, determination, calculation, and determination to achieve a programming function. For example, the processor could be a computer, a microprocessor, a CPU, an ASIC, or a circuitry (logic circuits), or a combination thereof.

In addition, the computer-readable recording medium includes all types of storage devices in which data that can be read by a computer system may be stored. For example, the memory include at least one a flash memory, a hard disk, a microcard, a card (e.g., a Secure Digital (SD) card or an eXtream Digital (XD) card), and the like, and a Random Access Memory (RAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk.

The recording medium may be electrically connected to the processor, and the processor retrieves and records data from the recording medium. The recording medium and the processor may be either integrated or physically separated.

First, the accompanying drawings will be briefly described, and examples of the present disclosure will be described in detail with reference to the drawings.

Figure 3:
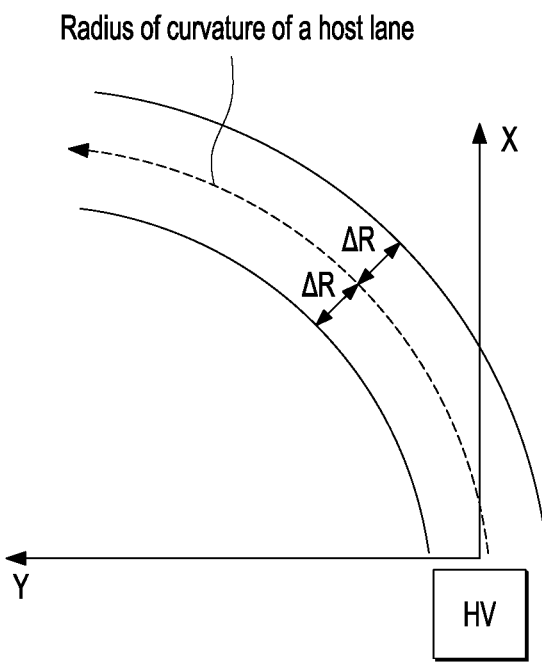
FIG. 3 is a diagram for describing a process of determining a vehicle lane.
Figure 4:
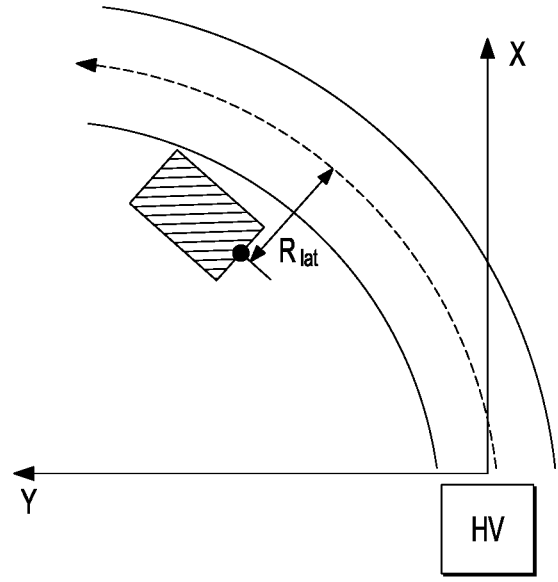
FIG. 4 illustrates a lateral position relationship between a candidate object and a host vehicle.
Figure 5:
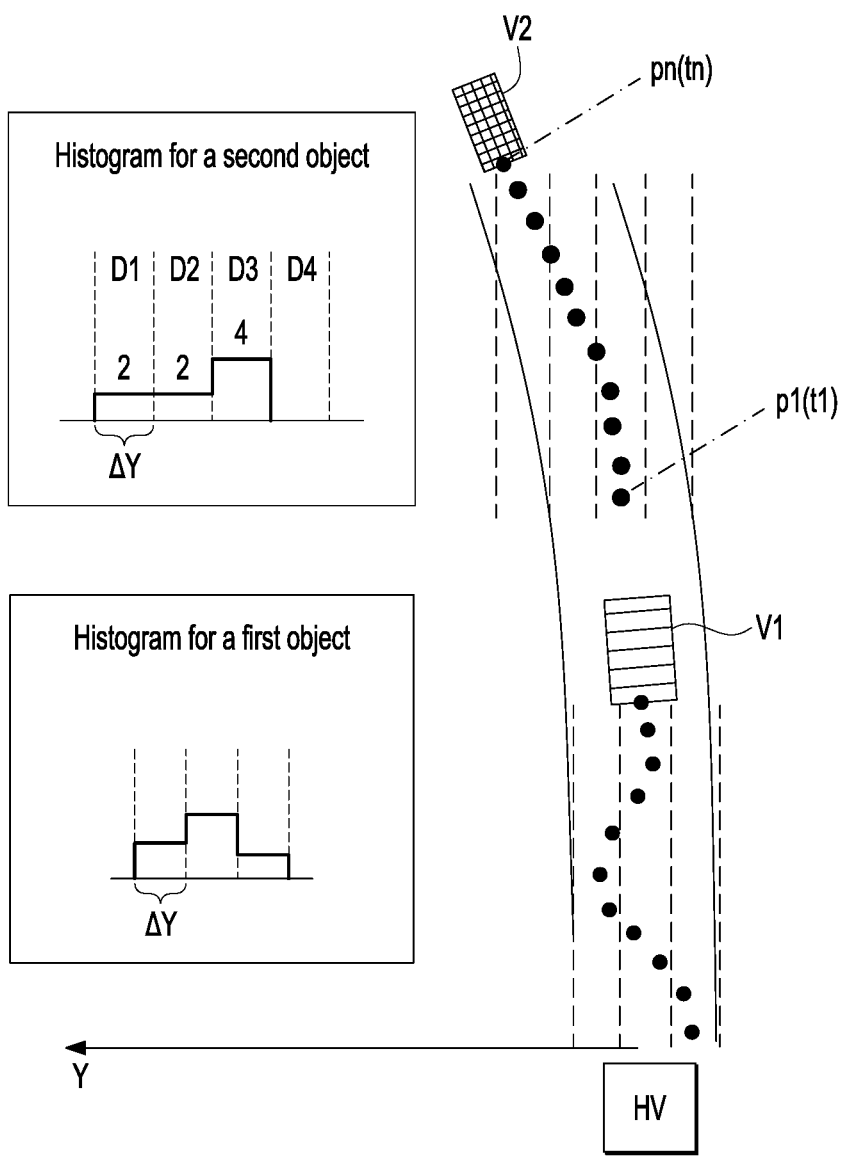
FIG. 5 is a diagram for describing determining a lateral position of a candidate object using lateral position accumulation data over time.
Figure 6:
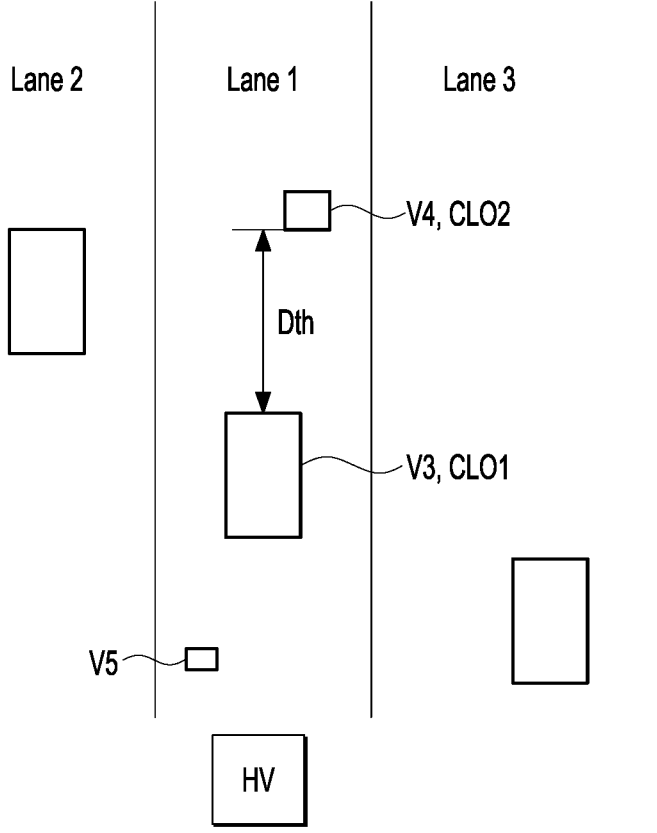
FIG. 6 is a diagram for explanation of selection of the first closest preceding object and the second closest preceding object.

FIG. 1 illustrates an object perception apparatus according to one or more aspects of the present disclosure. FIG. 2 is a flowchart illustrating an object perception method according to one or more aspects of the present disclosure. FIG. 3 is a drawing for describing a process of determining an ego-lane, and FIG. 4 illustrates a lateral position relationship between a candidate object and the ego-lane. Further, FIG. 5 is a view for explaining a process of determining a lateral position of a candidate object using lateral position accumulated data according to time, and FIG. 6 is a view for explaining selection of the first closest preceding object and the second closest preceding object.

As shown in FIG. 1, the object perception apparatus according to an example configuration of the present disclosure may include a LiDAR sensor, a memory, and a processor.

The LiDAR sensor may be an example of a sensor for recognizing surrounding objects, and the present disclosure is not necessarily limited thereto.

Also, the memory may comprise an example of a computer-readable recording medium, and the present disclosure is not limited thereto.

The memory stores a computer program and related data for realizing an object recognition method to be described later.

The processor realizes the object perception method by retrieving and executing the computer program and related data stored in the memory.

The object perception apparatus of the present example may be mounted on a vehicle, but it is not limited thereto.

Hereinafter, an object perception method will be described using the flowchart of FIG. 2.

First, in S10, an object is detected using a LiDAR sensor.

The LiDAR sensor emits, for example, a single circular laser pulse with a wavelength of 905 nm to 1550 nm toward an object, and subsequently measures time for which the laser pulse reflection returned from the object within the measurement range, thereby sensing information about the object, such as a distance from the LiDAR sensor to the object, a direction, a speed, a temperature, a material distribution, and a feature of concentration of the object.

The LiDAR sensor includes a transmitter (not shown) for transmitting a laser pulse and a receiver (not shown) for receiving a laser reflection returning from the surface of an object present within a sensor range.

The LiDAR sensor has a Field Of View (FOV), which may be an observable region. The viewing angle can be divided into a horizontal viewing angle and a vertical viewing angle.

Since the LiDAR sensor has higher detection accuracy in a longitudinal direction (an X-axis direction in FIGS. 3, 4, and 5) and a lateral direction (a Y-axis direction in FIGS. 3, 4, and 5) than a radar, the LiDAR sensor can provide accurate longitudinal/lateral position information, and thus it can be easily used for detecting obstacles, vehicle position recognition, etc.

Examples of the LiDAR sensor include a two-dimensional (2D) LiDAR sensor and a three-dimensional (3D) LiDAR sensor. The 2D LiDAR sensor may be configured to be tilted or rotated and can be used to secure LiDAR data including 3D information by tilt or rotation. The 3D LiDAR sensor can acquire a plurality of points in the third dimension, and can also predict height information of an obstacle, thereby helping accurate and detailed object detection or tracking.

The 3D LiDAR sensor can be implemented by configuring one channel with a plurality of 2D LiDAR sensors in a vertical direction. The 3D LiDAR sensor from the above-described example may be configured to provide 16 or 32 channels in a vertical direction. The LiDAR data from the plurality of channels acquired as described above can be projected onto a predetermined quantity of layers (smaller than the quantity of channels) and can be converted into multi-layer data.

The LiDAR sensor can output point cloud data, and the point cloud data can be acquired for each time frame at a predetermined time interval.

The LiDAR data can be processed through data processing such as pre-processing, clustering, and object detection.

First, the preprocessing can perform calibration for matching coordinates between the LiDAR sensor and the vehicle on which the LiDAR sensor may be mounted. In other words, the LiDAR sensor can convert the LiDAR data apt for a reference coordinate system (e.g., a Cartesian coordinate system having the center of the front bumper of the host vehicle as the original point) depending on the position and the angle at which the LiDAR sensor is mounted on the vehicle. In addition, a low intensity or low reflection can be removed through filtering based on intensity or confidence information of the LiDAR data.

In addition, data reflected by the vehicle body of the host vehicle can be removed through preprocessing. That is, since there may be a region covered by the vehicle body of the host vehicle depending on the mounting position and the viewing angle of the LiDAR sensor, data reflected from the vehicle body of the host vehicle can be removed using the reference coordinate system.

After preprocessing, points of the LiDAR data are grouped into a plurality of clusters through a clustering process with a clustering algorithm.

For each point cluster, a square-shaped cluster box including points of the corresponding cluster can be defined.

These clusters are options of objects to be detected, and the shape of the corresponding object may be analyzed through an object detection process.

For example, main points can be extracted from points included in the cluster, and outer points can be determined among the main points by using a "convex hull" algorithm.

Lines connecting the outer points form a contour of the corresponding object. Also, a square box, i.e., a bounding box, in which a sum of distances from outer points to a shortest distance side is smallest, among the square boxes surrounding the outer points can be defined.

In short, the shape information (i.e., outer points, contours, bounding boxes, longitudinal and lateral lengths based on the bounding boxes, etc.) and speed for each object are acquired through the above-described data processing on the LiDAR data.

In the following S20, objects positioned in the host vehicle among the detected candidate objects are determined.

In order to determine the objects in the host vehicle, determining a host vehicle lane may be performed prior to the determination, which will be described in detail hereinafter.

The host vehicle can be determined using the speed and the yaw rate of the host vehicle HV.

In this regard, the yaw rate used may differ depending on the speed of the host vehicle HV If the speed of the host vehicle (HV) is equal to or greater than the predetermined first speed, the yaw rate acquired from the value sensed through the sensor in the vehicle may be used as is.

Various sensors such as a GPS sensor, a speed sensor, an acceleration sensor, a steering angle sensor, a vision sensor, and the like, can be provided in the vehicle, and through these sensors, acquiring information such as a vehicle longitudinal speed, a lateral (Y-axis direction) speed, a longitudinal (X-axis direction) acceleration, a transverse acceleration, a steering angle, a vehicle wheel speed and a wheel acceleration, a road curvature information, and the like is possible.

The yaw rate can be acquired from the sensed values with the above-described sensors, and the following five methods are explicably described.

Method 1

As a method of calculating a yaw rate based on a steering angle and a vehicle speed, the steering angle may be divided by a value acquired by multiplying a vehicle width (i.e., a distance between left and right wheels) and a vehicle lateral speed.

Method 2

This method acquires the lateral acceleration of a vehicle by dividing the lateral velocity.

Method 3

This method acquired by multiplying a road curvature and a lateral velocity of the vehicle.

Method 4

The method using a wheel speed of a vehicle and a lateral speed of the vehicle may be acquired by deducting a value that may be acquired by subtracting a right wheel speed from a left wheel speed of the vehicle as the subtracted value of a vehicle width (e.g., a distance between left and right wheels) and a multiplied lateral speed of the vehicle.

Method 5

This method is a method of using a pair of GPS receiver information installed in the front and rear of the vehicle.

If the speed becomes lower on the other hand, the error of the yaw rate based on the sensed value becomes larger, and therefore, if the speed of the host vehicle (HV) exceeds the predetermined second speed and is less than the first speed, the yaw rate acquired from the sensed value is not used as is and is corrected.

Specifically, the sensed yaw rate may be corrected as in Equation 1 below.

$$V_{lat} \cong V \times \tan(\delta)$$ [Equation 1]

$$\varphi_{slow} = \frac{V \times \tan(\delta)}{L} \cong \frac{V_{lat}}{L}$$

-continued $$\bar{\varphi} = ((1 - \alpha) \times \varphi_{slow}) + (\alpha \times \varphi)$$

Here, L is the distance between the left and right wheels of the vehicle, δ is the steering angle, V is the vehicle speed, Vlat is the vehicle lateral speed, and φ is the yaw rate.

If the yaw rate is determined, the radius of curvature Rh of the ego-lane may be determined through Equation 2 below.

$$Radius\ of\ curvature = \frac{V}{\varphi}$$ [Equation 2]

If the vehicle speed is lower, e.g., in the case where the vehicle speed is equal to or lower than the second speed (e.g., if the vehicle is close to the stop state), it may be difficult to apply the above-described method such as Equation 1 that uses the steering angle and the speed, and thus in this case, it may be possible to stop recognizing the preceding object in the vehicle by the self-vehicle by the method described below.

If the radius of curvature Rh of the ego-lane is determined as shown in FIG. 3, the ego-lane can be determined to have the predetermined range ΔR in the inner and outer radial directions. The "ΔR" can be equal to half of an overall road width as an example.

If the vehicle lane is determined, objects positioned on the ego-lane (hereinafter, the ego-lane objects) among the candidate objects can be determined.

FIG. 4 illustrates a process of determining ego-lane objects, which will be described below.

As shown in FIG. 4, if the lateral position distance $R_{lat}$ from the center of the host vehicle to the candidate object is within a predetermined value (i.e., ΔR), the candidate object may be determined as the ego-lane object.

Here, the lateral position of the candidate object can be determined based on the center point of the rear side of the bounding box of the candidate object.

The lateral position is determined from data accumulated over time for safe determination.

For example, as shown in FIG. 5, it is assumed that lateral positions of the second object are moved from the first point p1 to pn in time frames from the past t1 to the present tn.

The lateral positions according to time can be divided by the regions D1 to D4 equally divided in the lateral direction, and a histogram can be acquired by determining a score according to the quantity of lateral position points in each divided region.

In the case of the second object V2 as shown in FIG. 5, since the first divided region D1 has two lateral position points, the second divided region D2 has two lateral position points, and the third divided region D3 has four lateral position points, the first and second divided regions D1 and D2 have a score of 2, and the third divided region D3 has a score of 4.

In the histogram, a horizontal position of a corresponding object may be determined from horizontal positions of a divided region with the largest score. For example, the lateral position of the corresponding object can be determined as an average value of the lateral positions of the divided region with the largest score.

For each candidate object, whether the candidate object corresponds to an ego-lane object may be determined by using a lateral position determined based on time accumulated data.

Referring back to FIG. 2, in S30, preceding objects are determined among the ego-lane objects.

The determination of the preceding object may vary according to the size of a radius of curvature of the ego-lane, which will be described below.

First, if the radius of curvature of the ego-lane exceeds a threshold radius (e.g., in case a radius of curvature of the ego-lane is close to a near straight line), objects having a lateral speed equal to or lower than a threshold speed based on tracking data for the ego-lane objects and having a lateral length and a longitudinal length equal to or greater than the predetermined length are determined as preceding objects.

The tracking data can be data that is managed by tracking corresponding object data depending on a time frame with respect to the objects based from LiDAR detection, and since tracking of objects is well known, a detailed description thereof will be omitted.

In this case based on the object having the first predetermined distance or more from the host vehicle HV, it can be determined that the object is positioned inside the road boundary based on the tracking data of the corresponding object (e.g., based on the tracking box among the tracking data) as the preceding object.

If the radius of curvature of the ego-lane is equal to or less than the threshold radius, a moving object closer in the longitudinal direction than a moving object at a side of a direction of the ego-lane from a road boundary of the radius of curvature is determined as the preceding object.

If the preceding objects are determined in the following S40, a closest preceding object (hereinafter, a first closest preceding object) and a preceding object positioned in front thereof (hereinafter, a second closest preceding object) are determined based on the distance to the host vehicle HV.

The first closest preceding object is determined among objects satisfying the predetermined size condition among the preceding objects.

For example, the size condition can be determined considering the overall length in a lateral direction and a longitudinal direction of the vehicle.

On the other hand, the second closest preceding object does not apply the above-described size condition, and is determined as a preceding object spaced apart from the first closest preceding object by a set distance in a forward direction.

The second closest preceding object can be hidden by the first closest preceding object and thus the detected size can be small, and thus the size condition is not considered.

For example, FIG. 6 shows a result of determining a first closest preceding object CLO1 and a second closest preceding object CLO2 among objects of the ego-lane Lane 1.

In FIG. 6, the third object V3 and the fourth object V4 are objects determined as preceding objects of the ego-lane Lane 1, and the fifth object V5 is an object of the ego-lane Lane 1, but an object that is not a preceding object, i.e., a moving object.

The third object V3 is determined as the first proximity closest object CLO1 because it satisfies the size condition and is the preceding object closest to the host vehicle HV, and the fourth object V4 is determined as the second closest preceding object CLO2 because it does not satisfy the size condition but as a preceding object located within the predetermined distance Dth forward from the first closest preceding object CLO1.

In FIG. 2 of S60, information regarding the detected objects are output.

In this regard, the first flag is given to the first closest preceding object and the second flag is given to the second closest preceding object.

In addition, priority orders are given to the ego-lane objects, wherein the priority order of the first closest preceding object is given over the second closest preceding object, and objects other than the preceding objects among the ego-lane objects are given over the priority order of the first closest preceding object if the objects are closer than the first closest preceding object, and are given in subordinate order if the objects are farther than the first closest preceding object.

Since the second closest preceding object is recognized, the second closest preceding object can be counteracted by rapidly determining the first closest preceding object in a situation where the first closest preceding object has been cut out.

If the second closest preceding object appears, determining whether the corresponding object is a stationary or a moving object is difficult, and the reliability of the corresponding object data is lowered and output by determining the second closest preceding object, thereby adjusting the reliability of the LiDAR data to a lower setting if the target is selected during driving control.

At least one aspect of the present disclosure aims to provide quick and accurate perception results for the nearest preceding object.

In particular, at least one aspect of the present disclosure aims to promptly determine an object in front of a nearest preceding object as the nearest preceding object in a situation where the nearest preceding object is cut out and to provide a recognition result for the object.

An object perception method according to the present disclosure comprises detecting candidate objects using at least one sensor, determining ego-lane objects from among the candidate objects, determining preceding objects among the ego-lane objects, and determining a first closest preceding object and a second closest preceding object from among the preceding objects.

In at least one example of the present disclosure, determining the ego-lane objects includes determining a radius of curvature of an ego-lane using a yaw rate and a speed of the host vehicle and determining the ego-lane objects using the radius of curvature among the candidate objects.

In at least one aspect of the present disclosure, the yaw rate is a sensed value if a speed of the host vehicle is equal to or greater than a first speed, or a value acquired by correcting the sensed value using a lateral speed of the host vehicle if a speed of the host vehicle exceeds a second speed and is less than the first speed.

In at least one aspect of the present disclosure, determining the ego-lane objects includes determining the ego-lane objects based on lateral positions of the candidate objects with respect to the ego-lane.

In at least one aspect of the present disclosure, the lateral positions each is determined from accumulated data of a lateral position of a corresponding candidate object over time.

In at least one aspect of the present disclosure, determining the preceding objects includes determining an object as a preceding object with a lateral length and a longitudinal length equal to or greater than predetermined lengths among longitudinal moving objects having a lateral speed equal to or less than a threshold speed based on tracking data for the ego-lane objects, if a radius of curvature of an ego-lane exceeds a threshold radius.

In at least one aspect of the present disclosure, determining the preceding objects further comprises determining as the preceding object a moving object that is closer in a longitudinal direction than a moving object that is present at a side of a direction of the ego-lane from a road boundary the radius of curvature, if the radius of curvature of the ego-lane is equal to or less than the threshold radius.

In at least one aspect of the present disclosure, determining the closest preceding objects comprises determining an object that satisfies a predetermined size condition among the preceding objects and is closest to the host vehicle in the longitudinal direction as the first closest preceding object.

In at least one aspect of the present disclosure, determining the closest preceding object comprises determining an object spaced apart from the first closest preceding object by a front predetermined distance among the preceding objects as the second closest preceding object.

In at least one aspect of the present disclosure, the method further comprising an outputting step, wherein the outputting step comprises assigning a first flag to the first closest preceding object and assigning a second flag to the second closest preceding object; and assigning a priority order to each of the ego-lane objects, wherein the priority order of the first closest preceding object is prioritized over the second closest preceding object, and objects other than the preceding objects among the ego-lane objects are prioritized over the priority order of the first closest preceding object if closer than the first closest preceding object from the host vehicle and otherwise assigned by later priority orders.

According to another aspect, an object perception apparatus comprises at least one sensor that detects surrounding objects, a computer-readable recording medium storing a computer program of an object perception method, and a processor executing the computer program, wherein the object perception method includes detecting candidate objects using the at least one sensor, determining ego-lane objects among the candidate objects, determining preceding objects among the ego-lane objects, and determining a first closest preceding object and a second closest preceding object among the preceding objects.

In the object perception apparatus according to at least one example of the present disclosure, determining the ego-lane object comprises determining a radius of curvature of an ego-lane using a speed and a yaw rate of the host vehicle and determining the ego-lane objects among the candidate objects using the radius of curvature.

In the object perception apparatus according to at least one aspect of the present disclosure, the yaw rate is a sensed value if the speed of the host vehicle is equal to or greater than a first speed, or a value acquired by correcting the sensed value using a lateral speed of the host vehicle if a speed of the host vehicle exceeds the second speed and is less than the first speed.

In the object perception apparatus according to at least one aspect of the present disclosure, determining the ego-lane objects includes determining the ego-lane objects based on lateral positions of the candidate objects with respect to the host vehicle.

In the object perception apparatus according to at least one aspect of the present disclosure, the lateral position is each determined from accumulated data of a lateral position of a corresponding candidate object over time.

In the object perception apparatus according to at least one aspect of the present disclosure, determining the preceding objects includes determining an object as a preceding object with a lateral length and a longitudinal length equal to or greater than predetermined lengths among longitudinal moving objects having a lateral speed equal to or less than a threshold speed based on tracking data for the ego-lane objects if a radius of curvature of an ego-lane exceeds a threshold radius.

In the object perception apparatus according to at least one aspect of the present disclosure, determining the preceding objects further comprises determining as the preceding object a moving object that is closer in a longitudinal direction than a moving object that is present at a side of a direction of the ego-lane from a road boundary the radius of curvature, if the radius of curvature of the ego-lane is equal to or less than the threshold radius.

In the object perception apparatus according to at least one aspect of the present disclosure, determining the closest preceding objects comprises determining an object that satisfies a predetermined size condition among the preceding objects and is closest to the host vehicle in the longitudinal direction as the first closest preceding object.

In the object perception apparatus according to at least one aspect of the present disclosure, determining the closest preceding object comprises determining an object spaced apart from the first closest preceding object by a front predetermined distance among the preceding objects as the second closest preceding object.

The object perception apparatus according to at least one aspect of the present disclosure, the method further comprises an outputting step, wherein the outputting step comprises assigning a first flag to the first closest preceding object and assigning a second flag to the second closest preceding object; and assigning a priority order to each of the ego-lane objects, wherein the priority order of the first closest preceding object is prioritized over the second closest preceding object, and objects other than the preceding objects among the ego-lane objects are prioritized over the priority order of the first closest preceding object if closer than the first closest preceding object from the host vehicle and otherwise assigned by later priority orders.

According to one aspect of the present disclosure, it is possible to acquire a quick and accurate recognition result for the nearest preceding object in the host vehicle.

Through such result, a more improved driving stability may be achievable.

What is claimed is:

1. A method performed by a host vehicle comprising:
   detecting candidate objects using at least one sensor mounted on the host vehicle;
   determining ego-lane objects from among the candidate objects, the ego-lane objects being objects detected as located in an ego-lane in which the host vehicle is traveling;
   determining preceding objects, among the ego-lane objects, traveling ahead of the host vehicle in the ego-lane;
   determining a first closest preceding object and a second closest preceding object from among the preceding objects, the first closest preceding object being an ego-lane object which travels at a closest distance from the host vehicle, and the second closest preceding object being an ego-lane object which travels at a second closest distance from the host vehicle; and
   controlling, based on movements of the first closest preceding object and the second closest preceding object, driving of the host vehicle.

2. The method of claim 1, wherein determining the ego-lane objects comprises:
   determining a radius of curvature of the ego-lane using a yaw rate and a speed of the host vehicle; and determining the ego-lane objects, using the radius of curvature, among the candidate objects.

3. The method of claim 2, wherein, for a first host vehicle speed that is equal to or greater than a first speed, the yaw rate comprises a sensed value for the first host vehicle speed, or, for a second host vehicle speed that is greater than a second speed but less than the first speed, the yaw rate comprises a value acquired by correcting the sensed value using a lateral speed of the host vehicle.

4. The method of claim 2, wherein determining the ego-lane objects comprises determining the ego-lane objects based on lateral positions of the candidate objects with respect to the ego-lane.

5. The method of claim 4, wherein each of the lateral positions is determined from accumulated data of a lateral position of a corresponding candidate object over time.

6. The method of claim 1, wherein determining the preceding objects comprises, for a first radius of curvature of the ego-lane that exceeds a threshold radius, determining an object as a preceding object of the preceding objects if a lateral length and a longitudinal length are equal to or greater than predetermined lengths among longitudinal moving objects having a lateral speed equal to or less than a threshold speed based on tracking data for the ego-lane objects.

7. The method of claim 6, wherein determining the preceding objects further comprises, for a second radius of curvature of the ego-lane that is equal to or less than the threshold radius, determining as the preceding object a first moving object that is closer in a longitudinal direction than a second moving object that is present at a side of a direction of the ego-lane from a road boundary of the second radius of curvature.

8. The method of claim 1, wherein determining the first closest preceding object comprises determining an object that satisfies a predetermined size condition among the preceding objects and is closest to the host vehicle in a longitudinal direction as the first closest preceding object, and wherein controlling the driving of the host vehicle comprises:

detecting the first closest preceding object moving from the ego-lane to a different lane;

determining, based on detecting the first closest preceding object moving from the ego-lane to the different lane, the second closest preceding object to be a new closest preceding object;

identifying, based on determining the second closest preceding object to be the new closest preceding object, a new second closest preceding object; and controlling, based on a movement of the new closest preceding object, the driving of the host vehicle.

9. The method of claim 8, wherein determining the second closest preceding object further comprises determining an object spaced apart from the first closest preceding object by a front predetermined distance among the preceding objects as the second closest preceding object.

10. The method of claim 1, further comprising:

assigning a first flag to the first closest preceding object and assigning a second flag to the second closest preceding object;

assigning a priority order to each of the ego-lane objects, wherein the first closest preceding object is prioritized over the second closest preceding object;

for objects other than the preceding objects among the ego-lane objects that are closer than the first closest preceding object to the host vehicle, prioritizing the objects other than the preceding objects over the first closest preceding object; and outputting information associated with the prioritized objects other than the preceding objects.

11. An apparatus of a host vehicle, the apparatus comprising:

at least one sensor that is mounted on the host vehicle and detects surrounding objects;

one or more processors; and a computer-readable recording medium storing instructions that, when executed by the one or more processors, cause the apparatus to:

detect candidate objects using the at least one sensor;

determine ego-lane objects among the candidate objects, the ego-lane objects being objects detected as located in an ego-lane in which the host vehicle is traveling;

determine preceding objects, among the ego-lane objects, traveling ahead of the host vehicle in the ego-lane;

determine a first closest preceding object and a second closest preceding object among the preceding objects, the first closest preceding object being an ego-lane object which travels at a closest distance from the host vehicle, and the second closest preceding object being an ego-lane object which travels at a second closest distance from the host vehicle; and control, based on movements of the first closest preceding object and the second closest preceding object, driving of the host vehicle.

12. The apparatus of claim 11, wherein determining the ego-lane objects comprises determining a radius of curvature of the ego-lane using a speed and a yaw rate of the host vehicle and determining the ego-lane objects among the candidate objects using the radius of curvature.

13. The apparatus of claim 12, wherein, for a first host vehicle speed that is equal to or greater than a first speed, a yaw rate comprises a sensed value for the first host vehicle speed, or, for a second host vehicle speed that is greater than a second speed but less than the first speed, the yaw rate comprises a value acquired by correcting the sensed value using a lateral speed of the host vehicle.

14. The apparatus of claim 12, wherein determining the ego-lane objects comprises determining the ego-lane objects based on lateral positions of the candidate objects with respect to the host vehicle.

15. The apparatus of claim 14, wherein the each of the lateral positions are determined from accumulated data of a lateral position of a corresponding candidate object over time.

16. The apparatus of claim 11, wherein determining the preceding objects comprises, for a first radius of curvature of the ego-lane that exceeds a threshold value, determining an object as a preceding object of the preceding objects if a lateral length and a longitudinal length are equal to or greater than predetermined lengths among longitudinal moving objects having a lateral speed equal to or less than a threshold speed based on tracking data for the ego-lane objects.

17. The apparatus of claim 16, wherein determining the preceding objects further comprises, for a second radius of curvature of the ego-lane that is equal to or less than the threshold value, determining as the preceding object a first moving object that is closer in a longitudinal direction than a second moving object that is present at a side of a direction of the ego-lane from a road boundary of the second radius of curvature.

18. The apparatus of claim 11, wherein determining the first closest preceding object comprises determining an object that satisfies a predetermined size condition among the preceding objects and is closest to the host vehicle in a longitudinal direction as the first closest preceding object.

19. The apparatus of claim 18, wherein determining the second closest preceding object further comprises determining an object spaced apart from the first closest preceding object by a front predetermined distance among the preceding objects as the second closest preceding object, and wherein controlling the driving of the host vehicle comprises:

detecting the first closest preceding object moving from the ego-lane to a different lane;

determining, based on detecting the first closest preceding object moving from the ego-lane to the different lane, the second closest preceding object to be a new closest preceding object;

identifying, based on determining the second closest preceding object to be the new closest preceding object, a new second closest preceding object; and controlling, based on a movement of the new closest preceding object, the driving of the host vehicle.

20. The apparatus of claim 11, wherein the instructions, when executed by the one or more processors, further cause the apparatus to:

assign a first flag to the first closest preceding object and assign a second flag to the second closest preceding object;

assign a priority order to each of the ego-lane objects, wherein the first closest preceding object is prioritized over the second closest preceding object;

for objects other than the preceding objects among the ego-lane objects that are closer than the first closest preceding object to the host vehicle, prioritize the objects other than the preceding objects over the first closest preceding object; and output information associated the prioritized objects other than the preceding objects.

* * * * *